United States Patent [19]
Hronas et al.

[11] Patent Number: 5,515,903
[45] Date of Patent: May 14, 1996

[54] METHOD OF MAKING A MOLD

[75] Inventors: John J. Hronas; Michael J. Hronas, both of Erie, Pa.

[73] Assignee: Multi-Products, Incorporated, Erie, Pa.

[21] Appl. No.: 492,238

[22] Filed: Jun. 19, 1995

[51] Int. Cl.[6] .................................................. B22C 7/06
[52] U.S. Cl. .......................... 164/45; 164/6; 164/124; 164/127
[58] Field of Search ............................. 164/6, 529, 45, 164/122, 124, 127, 47, 34, 35

[56]  References Cited

U.S. PATENT DOCUMENTS

| | | | |
|---|---|---|---|
| 898,728 | 9/1908 | Cox | 164/45 |
| 2,821,760 | 2/1958 | Kurzinski | 22/216 |
| 3,065,511 | 11/1962 | Leitzel . | |
| 3,982,934 | 9/1976 | Wentzell . | |
| 4,611,371 | 9/1986 | Fujino et al. . | |
| 4,682,643 | 7/1987 | Bernhardt et al. | 164/34 |
| 4,710,334 | 12/1987 | Rosetti | 264/102 |

FOREIGN PATENT DOCUMENTS

| | | |
|---|---|---|
| 167364 | 12/1953 | Australia . |
| 3182313 | 8/1991 | Japan . |

*Primary Examiner*—Jack W. Lavinder
*Assistant Examiner*—Randolph Herrick
*Attorney, Agent, or Firm*—William L. Krayer

[57]  ABSTRACT

A method is disclosed for making molds for use in injection molding wherein a cement replica is made of a pattern by curing the cement in a silicon rubber negative of the pattern, then pouring molten zinc or zinc alloy into a frame containing the cement replica. The cooling of the mold metal is controlled by the direct application of flame and frequent adjustments of clamps which firmly contact the mold to a solid surface.

16 Claims, 3 Drawing Sheets

5,515,903

METHOD OF MAKING A MOLD

TECHNICAL FIELD

This invention is in the field of mold making, particularly the manufacture of molds for use in injection molding from relatively soft metals which nevertheless can be used for large numbers of reproductions of the molded article.

BACKGROUND OF THE INVENTION

Conventionally, relatively soft metals such as zinc and zinc alloys, particularly alloys with aluminum and/or magnesium, are used for plastic injection molds only when small numbers of prototypes are desired and/or when quality is not critical for the initial study of a prototype. Where larger numbers of the molded piece or article are needed, say, more than one hundred, and/or where quality is necessary even for a few prototypes, the molds are typically made from steel at much higher cost because of the skilled labor, time and material required.

The art is in need of a method of quickly making relatively inexpensive molds capable of making large runs of thermoplastic pieces, i.e. more than 100 and frequently many more than 100.

SUMMARY OF THE INVENTION

Our invention is a method of making a mold of at least 50% zinc in at least two parts as a negative replica of a pattern. Unlike processes of the past, our procedure assures that the zinc mold will have a useful life far beyond the usual few reproductions normally expected from molds of relatively soft metal such as zinc. Our process will make a mold capable of making at least one hundred units by thermoplastic injection molding without significant degradation, and will make it in a short time of great advantage in the marketplace.

Our invention is an improvement in the process known as plaster mold casting; we use plaster mold casting to make a zinc (or zinc alloy) mold, and we advantageously combine our process with one of the new computer-controlled processes for pattern making known as rapid prototyping. Our improvement is primarily in the particular manner in which we use and set the metal. As in conventional plaster mold casting, we employ a pattern which is a three-dimensional replica of the final desired product—in this case a thermoplastic product—built to anticipate shrinkage and to incorporate a draft to facilitate separation and removal in the various steps including the final thermoplastic molding step. As is also well known in the molding art, the pattern will be slightly larger than the desired final product, and surfaces normally parallel to the direction of separation or removal (the draw) will manifest a slight taper, or draft. The pattern is preferably made by one of the recently developed processes known as "rapid prototyping", generally based on computerized three-dimensional models which are used to control systems for building the prototypes or patterns. Among such systems is "laminated object manufacturing", by which sheets of paper or paper-like material, usually fed from a roll, are fed to a cutting zone where they are cut by a computer-controlled laser beam and adhered to each other in layers, thus building the pattern from thin layers of material. Another system is known as selective laser sintering. In this method, powdered material which can be sintered is fused one layer at a time by a laser beam which acts on instructions from a computer. In stereolithography, a similar layer-by-layer construction is achieved from a pool of liquid polymerizable or curable material. Fused deposition modeling utilizes a thin filament of curable material, also following a path dictated by a computer, to build the model one thin layer at a time. Solid ground curing uses incremental photomasks to expose a liquid photocurable pattern to ultraviolet light or other photoactivating energy. Our method is especially suitable for use with these and other rapid prototyping methods (defined herein as computer-aided incremental pattern building) because the combination of rapid prototyping and our mold construction method utilizing improved zinc mold treatment yields a very fast, reliable, and highly economic method of making prototypes of new products which would otherwise require months. Specifically, using rapid prototyping methods for pattern making in combination with our zinc mold manufacturing method can drastically reduce the time from design to injection molded product. In the past, the time from pattern to injection molding was typically eight to ten weeks; with our process it is commonly two weeks. In combination with rapid prototyping methods, our method permits the designer to have his actual product in quantities and times, and at a low expense, that permits him to experiment and adjust with much more flexibility and still meet tight scheduling demands. Our process is fast, accurate, and permits enough injection molded prototypes to be made so that the designer can even test market if he or she desires.

The pattern is placed on a work base and filler is placed around it to define a mold part line and a first exposed portion of the pattern; a frame is constructed around the pattern in sealed relationship to the work base, locator posts may be provided to assure exact placement of the mold parts with respect to each other, as is known in the art, and a negative is made of the first exposed portion by covering it with a liquid which cures to a rubbery solid as is known in the art. After curing, a plaster such as a dental plaster is poured over the rubber to fill the complete internal volume of the frame. After the plaster sets, the assembly including the rubbery solid with the negative is inverted, the filler removed, and a second rubbery solid is constructed by pouring the liquid curable material on top of the second exposed portion of the pattern, preferably after first coating the first rubbery solid with a mold release or equivalent material in order to prevent adherence of the second rubbery solid to the first. Plaster may be used to fill the volume next to the rubbery solids. The rubbery solid shapes are separated, the pattern removed, and the rubbery solids are placed within framed areas on a work base and surrounded with sand so the volume above them can be filled with a slurry of sand, water, and gypsum cement, taking the shape of the rubbery solid, and then permitted to solidify to form replicas of the two defined halves of the pattern. The solidified cement halves are then heated in an oven to remove virtually all free moisture, usually for about 72 hours at 300° F., making them quite hard. Molten metal, preferably zinc or a zinc alloy, is then poured into these cement halves, and permitted to solidify slowly, with the application of heat from a flame directly into the center of any sinkhole which may form; more metal is added to the sinkhole to maintain its approximate original level. When the zinc becomes hard, the two blocks of zinc mold are clamped to a solid steel surface and the clamps are adjusted throughout the cooling process to maintain the block in contact with the surface.

DETAILED DESCRIPTION OF THE INVENTION

Figure 1A:
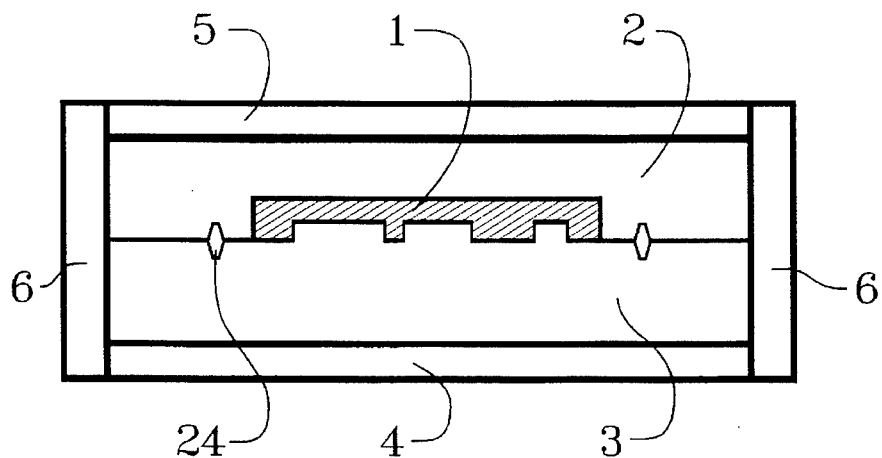
FIG. 1a shows the initial creation of two solid rubber negatives of a pattern.

The present invention involves the steps of (a) making a pattern—that is, an exact shape or replica of the desired article except for an increase in the dimensions of about 1.5% more or less, depending on the plastic molding material to be used, to allow for shrinkage; preferably the pattern is made by rapid prototyping as defined above (b) determining the position of a mold part line for two mold parts, with respect to the pattern; the mold parts may be referred to as the stationary part and the moving part, as they are to be utilized in the injection molding machine (c) determining the direction of relative movement of the two mold parts relative to each other to open and close the mold, and the direction the moving part will move, the draw, is perpendicular to the parting line (d) adjusting the pattern to provide a draft on all surfaces of the pattern which are approximately parallel to the proposed relative movement but tapered slightly with a draft as known in the art to prevent binding during movement of the mold and/or during mold release (e) placing the pattern on a work base (f) placing a filler such as clay at the mold line of the pattern to seal off a mold part surface oriented toward the work base and leave the other mold part surface exposed, and to seal off portions of the pattern which, if filled with metal, would interlock and/or otherwise not permit the separation of the two mold parts (g) providing a steel or other strong frame around the pattern on the work base, sealed to the work base, and extending to a point higher than the pattern, (h) placing locator posts or other tangible reference points near the frame, preferably anchored to the work base, (i) pouring a liquid rubber into the frame to completely cover the pattern (extend over it at least about an inch and be retained by the frame (j) permitting the liquid rubber to solidify (k) after the rubber is solidified, fill the rest of the frame with a plaster which may be referred to herein as the preferred dental plaster by pouring it over the rubber (l) after the dental plaster solidifies, remove the entire assembly (pattern, rubber and dental plaster) from the frame and turn it over so the pattern is now on top (m) remove the clay from the pattern to expose the entire surface of the pattern which had been oriented toward the work base (n) place a frame around the assembly (sealed against the rubber around its periphery); the frame extends some distance above the pattern and is preferably reinforced according to the peculiarities of the pattern, to guard against fracturing of the Hydroperm to be employed in step (w), (o) apply mold release agent to the exposed rubber surface (p) pour more liquid rubber into the space to a depth about the same as the thickness of the already solidified rubber on the other side of the pattern; the mold release agent prevents permanent adherence of the two portions of rubber (q) permit this second portion of rubber to solidify (r) pour dental plaster into the remaining space over the newly solidified rubber (s) permit the dental plaster to solidify (t) after curing of rubber and solidification of plaster, the frame is removed, the two halves are separated, and the pattern is removed (u) each half is now placed within its own heavy steel frame which allows room for an inch or so of sand around it (v) fill the area between the plaster/rubber assembly and the frame with sand approximately to the level of the rubber (w) fill the remaining area with "Hydroperm" or other gypsum cement to the top of the frame, which may be reinforced to minimize fracturing during casting; the Hydroperm is first mixed to a workable viscosity with sand and water (with the sand having an average particle size less than about 0.02 inch) to act as a heat sink (x) perform steps v and w on the other side (y) permit the "Hydroperm" to solidify and thus reflect the pattern (z) lift up the Hydroperm in its frame; the sand collapses and the rubber and dental plaster units are separated from the Hydroperm (aa) dry the Hydroperm in an oven for three days (bb) with a frame around the Hydroperm, pour the mold metal (zinc or zinc alloy) onto the Hydroperm to a depth of at least one-half inch (cc) permit the zinc to cool/solidify only gradually over a period of about one-half hour to about two hours by directing a gas flame toward the center of the metal box; add more zinc or other metal as sinkholes appear in the center of the block (dd) when the zinc or other metal is solidified, clamp the resulting solid metal mass at the corners to assure firm contact with a substantial base such as a two inch thick block of steel. This must be done before it cools below 510° F. The metal is then permitted to cool at ambient temperatures, while adjusting the clamps frequently (for example, every three minutes) to assure firm contact with the steel surface until the temperature of the metal is below about 450° F. and preferably until it is about 400° F. The metal will be found to have assumed the shape required for an excellent injection mold, retaining the slight oversize necessary to allow for shrinkage of the plastic.

It should be understood that there are many details of manipulation and technique which may be varied in the user's discretion. For example, when the rubbery solid negatives are made, the next step is best approached by creating a volume of plaster on top of the rubbery solid, as stated in step (k) of the Detailed Description of the Invention, above. The exact manner and composition for accomplishing this is a matter of preference within the skill of the art.

Figure 1B:
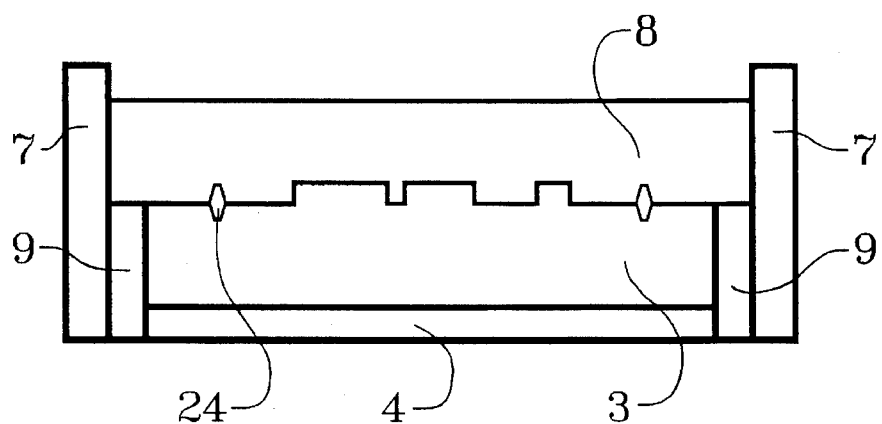
FIGS. 1b and 1c show the formation of plaster reproductions of their surfaces.
Figure 1C:
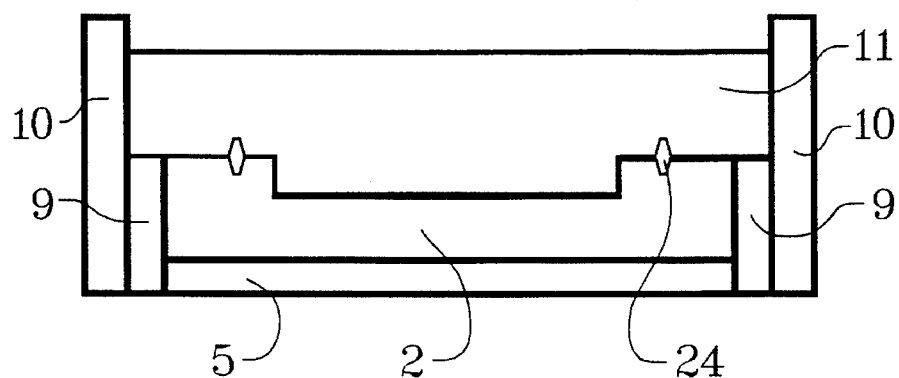

Referring now to the drawings, FIG. 1a may be understood by referring to step (s) and the immediately preceding steps in the above detailed description. Frame 6 retains the dental plaster 4 and 5 on top and bottom and the solidified rubber portions 2 and 3 which have profiles defined by pattern 1. Locator posts 24 may be optionally placed as shown. In FIG. 1b, the lower rubber portion 3 from FIG. 1a has been placed as suggested in step (u) of the detailed description into its own frame 7 and the upper rubber portion 2 from FIG. 1a has been placed in its own frame 10 in FIG. 1c, also as suggested in step (u) above. In FIG. 1b, the dental plaster 4 and rubber portion 3 are separated from frame 7 by sand 9; in FIG. 1c, sand 9 separates dental plaster 5 and rubber section 2 from frame 10. Hydroperm fills spaces 8 and 11 in FIGS. 1b and 1c as recited in step (w).

Figure 2A:
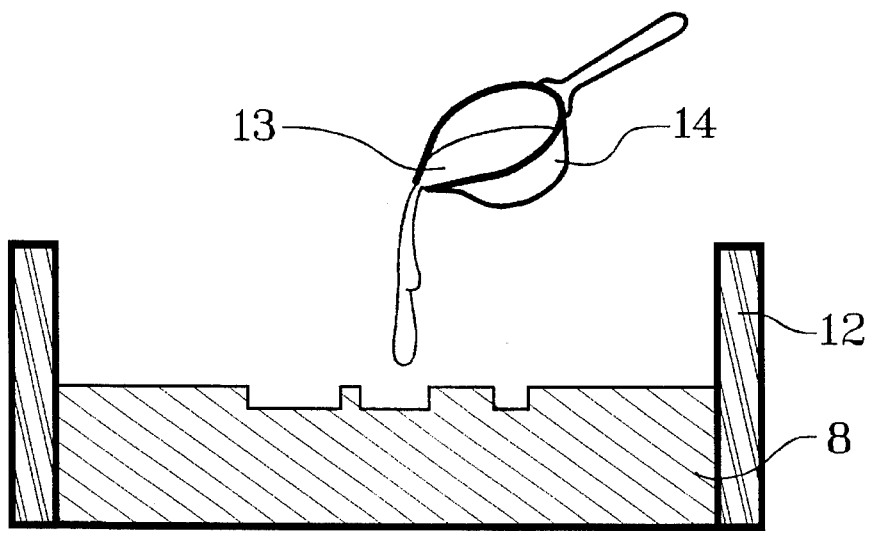
FIGS. 2a and 2b depict the pouring of zinc metal or an alloy onto the surfaces of the plaster reproductions, and treatment to assure proper cooling.
Figure 2B:
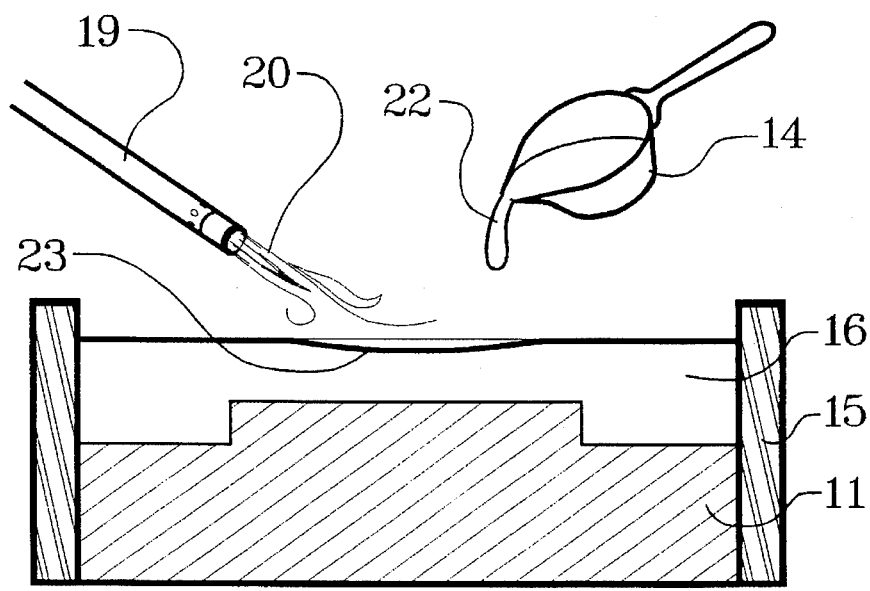

Steps (bb) and (cc) of the detailed description above is shown in FIGS. 2a and 2b. Frames 12 and 15 contain the Hydroperm sections 8 and 11 while zinc metal 13 is poured from ladle 14 to form the metal mold section 16, The metal mold section to be made in FIG. 2a will have a contour defined by Hydroperm section 8, and the metal mold section 16 will have a contour defined by Hydroperm section 11. As suggested in step (cc), the cooling procedure is retarded in FIG. 2b by impinging on the metal mold section 16 a flame 20 from burner 19 and pouring additional metal 22 from ladle 14 to fill sinkholes 23 which may develop in the metal mold section 16, typically in the center.

Figure 3A:
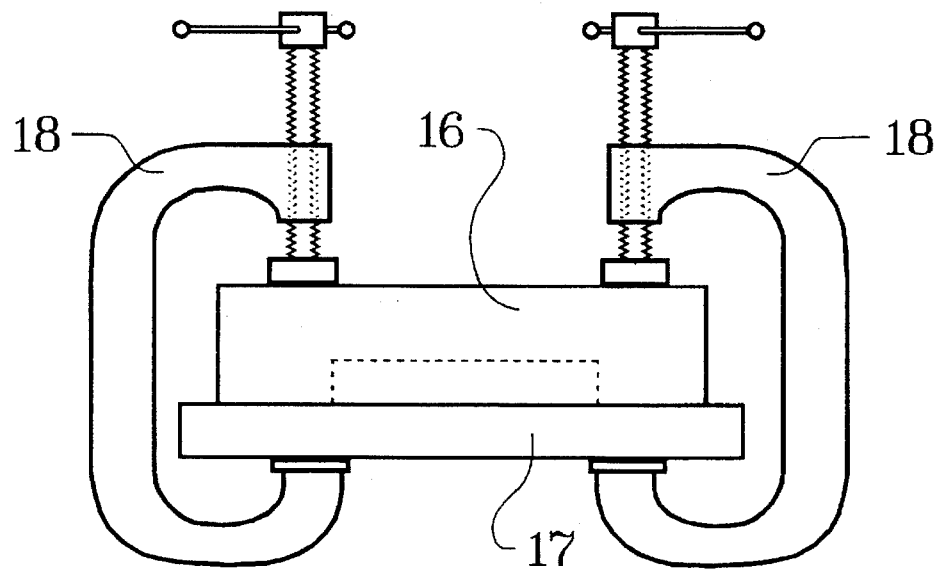
FIGS. 3a and 3b show a preferred procedure for clamping of the metal mold during cooling.
Figure 3B:
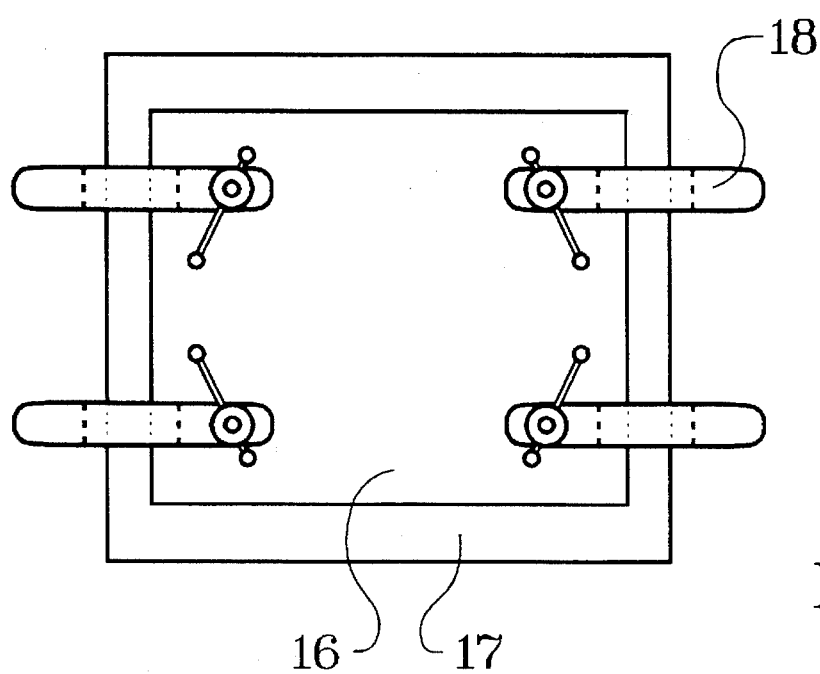

For FIGS. 3a and 3b, reference is made to step (dd) above. Metal mold section 16 is clamped to base 17 by clamps 18 which are adjusted as recited in step (dd) and the sentences following step (dd).

The above description is our preferred process in some detail. It should be understood that the dental plaster could be replaced by any of several types of plaster known as plaster of paris. The liquid rubber referred to in step (i) forms a rubber or rubbery solid; it is generally made from a 2-component system of catalyst and silicone polymerizate in a weight ratio of about 1:10. A preferred system is a condensation cured silicone designated by its manufacturer, Loctite Corporation of Newington, Conn., as V-1065. Hydroperm, our preferred material for step (w) above, is a trademark of the United States Gypsum Company for its gypsum cement sold for mold making; this material may be mixed to a workable slurry for our purposes with sand and water, generally using Hydroperm in amounts from about 25 to 50 percent by weight with sand at about 30–50% and water at about 20–35%; a preferred mixture is Hydroperm:sand:water in ratios 31:42:27 by weight, less exactly about (27–35):(38–46):(23–31). The zinc or zinc alloy can be an alloy of 50% to 100% zinc with aluminum, commercially available suitable alloys include ZA-2, ZA-8, ZA-12, and ZA-27, the numbers in each representing the approximate percentage of aluminum in the alloy, the balance of which is zinc.

Our invention provides the art with a unique way to expeditiously make injection molds which exhibit a minimum of warpage and which will last far longer than many common non-ferrous molds. When combined with use of patterns made from rapid prototyping, the time from conception of design to working prototype or test market model is drastically reduced.

We claim:

1. Method of making a mold part useful in thermoplastic injection molding comprising pouring molten zinc or zinc alloy into a ceramic or cement form made by plaster mold casting to form a solidified incipient zinc mold part, heating said incipient zinc mold part with an open flame while it solidifies, adding zinc or zinc alloy to the center depression which forms in said incipient zinc mold part as it cools, removing said incipient mold part from said form, clamping said incipient zinc mold part with clamps to a firm surface during further cooling, and adjusting said clamps frequently to assure continuous firm contact of said incipient zinc mold part with said firm surface until it is cooled to under 400° F.

2. Method of claim 1 wherein said incipient zinc mold part is clamped before it cools below 510° F.

3. Method of claim 1 wherein the clamps are adjusted at intervals of about three minutes until the temperature of said incipient zinc mold part reaches 450° F.

4. Method of making a mold of at least 50% zinc in at least two parts as a negative replica of a pattern, said mold being capable of making at least one hundred thermoplastic units by injection molding without degradation comprising (a) placing said pattern on a work base and placing filler in contact with said work base and placing said pattern to define a mold part line and a first exposed portion of said pattern thereabove (b) placing a frame around said pattern and sealing said frame to said work base (c) forming a first rubber negative of said first exposed portion of said pattern by filling said frame and covering said first exposed portion of said pattern with a liquid which cures to a rubbery solid, and curing said liquid to a first rubbery solid (d) inverting in a second frame said rubbery solid containing said first exposed portion of said pattern to expose a second exposed portion of said pattern, removing said filler, coating the surface of said rubbery solid with mold release agent and forming a second rubber negative of said second exposed portion of said pattern by filling said second frame and covering said second exposed portion of said pattern with a liquid which cures to a rubbery solid, and curing said liquid to a second rubbery solid, (e) separating said first and said second rubbery solids and removing said pattern (f) placing each of said first and second rubbery solids within frames on a work base and surrounding them with sand within said frames (g) forming cement replicas of first and second pattern halves by filling the remaining volumes within said frames with a cement slurry, permitting said cement slurry to solidify, and calcining it until it achieves suitable hardness, (h) separating said cement replicas from said rubbery solids, placing them in defined zones for receiving molten metal, and pouring molten metal including at least 50% zinc into said zones containing said replicas, (i) permitting said metal to solidify over a period of one-half to two hours by directing a flame toward the center of its upper surface and adding more zinc or zinc alloy to the sinkhole which appears, (j) removing said solidified metal from said zone and clamping said solidified metal to a solid steel surface and adjusting the clamps frequently to continuously assure firm contact of said solidified metal to said solid steel surface until the temperature of said solidified metal reaches 450° F.

5. Method of claim 4 in which the adjusting of the clamps in step (j) is continued until the temperature of said solidified metal reaches 400° F.

6. Method of claim 4 wherein said pattern is designed with a draft.

7. Method of claim 4 wherein said rubbery solid is a silicone rubber.

8. Method of claim 4 wherein said cement slurry is made from a gypsum cement.

9. Method of claim 8 wherein said cement slurry is made from gypsum cement, sand and water in weight ratios of about (25–50):(30–50):(20–35).

10. Method of claim 4 wherein after step (c) and before step (d) the volume above said rubbery solid is filled with plaster which is then solidified.

11. Method of claim 7 wherein said plaster is plaster of paris.

12. Method of quickly making a mold part useful in injection molding comprising (a) making a pattern by rapid prototyping, (b) making a cement replica of said pattern by plaster mold casting, (c) pouring molten zinc or zinc alloy into a frame containing said cement replica to make an incipient zinc mold part, (d) heating said incipient mold part with an open flame while it solidifies, (e) adding zinc or zinc alloy to the center depression which forms in said incipient zinc mold part as it cools, (f) removing said incipient mold part from said frame and clamping said incipient zinc mold part with clamps to a firm surface during further cooling, and (g) adjusting said clamps frequently to assure continuous firm contact of said incipient zinc mold part with said firm surface until it is cooled to under 400° F.

13. Method of claim 12 wherein said incipient mold part is clamped before it cools below 510° F.

14. Method of claim 12 wherein the clamps are adjusted at intervals of about three minutes until the temperature of said incipient mold part reaches 400° F.

15. Method of claim 12 wherein said pattern is made by laminated object manufacturing.

16. Method of claim 12 wherein said pattern is made by selective laser sintering.

* * * * *